United States Patent
Harish Gopala Pillai et al.

(10) Patent No.: US 9,606,523 B2
(45) Date of Patent: Mar. 28, 2017

(54) APPARATUS AND METHODS FOR EXTERNAL PROGRAMMING OF PROCESSOR OF LED DRIVER

(71) Applicant: PHILIPS LIGHTING HOLDING B.V., Eindhoven (NL)

(72) Inventors: Raman Nair Harish Gopala Pillai, Arlington Heights, IL (US); Kaustuva Acharya, Bartlett, IL (US)

(73) Assignee: PHILIPS LIGHTING HOLDING B.V., Eindhoven (NL)

( * ) Notice: Subject to any disclaimer, the term of this patent is extended or adjusted under 35 U.S.C. 154(b) by 79 days.

(21) Appl. No.: 14/390,628

(22) PCT Filed: Apr. 2, 2013

(86) PCT No.: PCT/IB2013/052621
§ 371 (c)(1),
(2) Date: Oct. 3, 2014

(87) PCT Pub. No.: WO2013/150443
PCT Pub. Date: Oct. 10, 2013

(65) Prior Publication Data
US 2015/0094827 A1    Apr. 2, 2015

Related U.S. Application Data

(60) Provisional application No. 61/620,038, filed on Apr. 4, 2012.

(51) Int. Cl.
G05B 19/042    (2006.01)
H05B 33/08    (2006.01)

(52) U.S. Cl.
CPC ..... *G05B 19/0426* (2013.01); *G05B 19/0421* (2013.01); *H05B 33/0809* (2013.01);
(Continued)

(58) Field of Classification Search
CPC ............ G05B 19/0426; G05B 19/0451; G05B 2219/1204; G05B 2219/13004; H05B 33/0809; H05B 33/0842
See application file for complete search history.

(56) References Cited

U.S. PATENT DOCUMENTS 5,933,090 A * 8/1999 Christenson ....... G07C 9/00817
307/10.2
6,016,038 A    1/2000 Mueller et al.
(Continued)

FOREIGN PATENT DOCUMENTS

WO    2003067934 A1    8/2003
WO    2009035948 A1    3/2009
(Continued)

*Primary Examiner* — Nathan L Laughlin

(57) ABSTRACT

External programming of at least one processor (30) of a LED driver (10). In a normal operation mode a first control input (22B/22C) of the LED driver (10) may be provided to a first processor input of the processor and a second control input (22B/22C) of the LED driver may be provided to a second processor input of the processor (30). In a programming mode the first and second control inputs (22B, 22C) may be provided to programming inputs of the processor (30) to thereby enable programming of the processor (30) via the first and second control inputs (22B, 22C).

4 Claims, 4 Drawing Sheets

(52) U.S. Cl.
   CPC . *H05B 33/0842* (2013.01); *G05B 2219/1204* (2013.01); *G05B 2219/13004* (2013.01)

(56) References Cited

U.S. PATENT DOCUMENTS

| | | | |
|---|---|---|---|
| 6,211,626 | B1 | 4/2001 | Lys et al. |
| 6,774,584 | B2 * | 8/2004 | Lys .......................... F21S 8/00 315/312 |
| 2004/0256625 | A1 | 12/2004 | Russell et al. |
| 2004/0263316 | A1 * | 12/2004 | Dix ........................ B60R 25/04 340/5.23 |
| 2005/0259995 | A1 * | 11/2005 | Schrodinger ........ H04B 10/504 398/182 |
| 2008/0036395 | A1 | 2/2008 | Zudrell-Kock et al. |
| 2009/0079357 | A1 * | 3/2009 | Shteynberg ........ H05B 33/0818 315/291 |
| 2010/0210234 | A1 * | 8/2010 | Hyde ..................... H04B 1/082 455/272 |
| 2010/0277104 | A1 | 11/2010 | Lin et al. |
| 2010/0321946 | A1 * | 12/2010 | Dingman ............. B60Q 1/2665 362/501 |
| 2011/0025226 | A1 | 2/2011 | Beij et al. |
| 2011/0291583 | A1 | 12/2011 | Shen |
| 2013/0028338 | A1 * | 1/2013 | Neyman .................. H03K 7/08 375/257 |
| 2013/0043795 | A1 * | 2/2013 | Burayez ............. H05B 37/0272 315/150 |

FOREIGN PATENT DOCUMENTS

| | | |
|---|---|---|
| WO | 2009039112 A1 | 3/2009 |
| WO | 2010150169 A1 | 12/2010 |

\* cited by examiner

APPARATUS AND METHODS FOR EXTERNAL PROGRAMMING OF PROCESSOR OF LED DRIVER

CROSS-REFERENCE TO PRIOR APPLICATIONS

This application is the U.S. National Phase application under 35 U.S.C. §371 of International Application No. PCT/IB2013/052621, filed on Apr. 2, 2013, which claims the benefit of U.S. Provisional Patent Application No. 61/620,038, filed on Apr. 4, 2012. These applications are hereby incorporated by reference herein.

The present invention is directed generally to driver circuitry for LED light sources. More particularly, various inventive methods and apparatus disclosed herein relate to external programming of at least one processor of a LED driver utilizing inputs of the LED driver.

Digital lighting technologies, i.e. illumination based on semiconductor light sources, such as light-emitting diodes (LEDs), offer a viable alternative to traditional fluorescent, HID, and incandescent lamps. Functional advantages and benefits of LEDs include high energy conversion and optical efficiency, durability, lower operating costs, and many others. Recent advances in LED technology have provided efficient and robust full-spectrum lighting sources that enable a variety of lighting effects in many applications. Some of the fixtures embodying these sources feature a lighting module, including one or more LEDs capable of producing different colors, e.g. red, green, and blue, as well as a processor for independently controlling the output of the LEDs in order to generate a variety of colors and color-changing lighting effects, for example, as discussed in detail in U.S. Pat. Nos. 6,016,038 and 6,211,626, incorporated herein by reference.

In certain LED lighting implementations, it is desirable to have the capability to upgrade the firmware of the processor of the LED driver powering one or more LEDs. For example, it may be desirable to upgrade the firmware of an LED driver processor to incorporate new features and/or to address bug fixes. Upgrades to LED driver processors have been performed utilizing a communication means such as DALI and the "in-application" programming capability of some processors. Although such in-application programming may be utilized to upgrade the firmware, it may have one or more drawbacks. For example, not all processors support in-application programming and/or the in-application programming may be slower than what is desired. Dedicated programming wires have also been utilized to perform upgrades to some LED driver processors. Although such dedicated programming wires may be utilized to upgrade the firmware, they may have one or more drawbacks such as increased materials costs for programming wires and/or increased space requirements in the LED driver.

Thus, there is a need in the art to provide methods and apparatus for external programming of at least one processor of a LED driver that optionally overcomes one or more drawbacks of existing programming methods.

The present disclosure is directed to inventive methods and apparatus for external programming of at least one processor of a LED driver. For example, in a normal operation mode a first control input of the LED driver may be provided to a first processor input of the processor and a second control input of the LED driver may be provided to a second processor input of the processor. In a programming mode, the first and second control inputs may be provided to programming inputs of the processor to thereby enable programming of the processor via the first and second control inputs.

Generally, in one aspect, a method of programming a processor of a LED driver is provided and includes the steps of: directing, in a normal operation mode, a first control input of the LED driver to a first processor input of the processor and a second control input of the LED driver to a second processor input of the processor; receiving a programming signal; entering a programming mode in response to the programming signal; and directing, in the programming mode, the first control input to a third processor input of the processor and the second control input to a fourth processor input of the processor. The third processor input and the fourth processor input are programming inputs.

In some embodiments, the method further includes coupling a programmer to the first control input and the second control input. In some versions of those embodiments, the method further includes utilizing the programmer to program the processor via the first control input and the second control input. The method may optionally further include coupling the programmer to a power source unique from a processor power source powering the processor.

In some embodiments, the first control input is also coupled to the first processor input in the programming mode. In some versions of those embodiments the second control input is also coupled to the second processor input in the programming mode. The method may further include decoupling the first control input from the first processor input in the programming mode.

In some embodiments, the first processor input receives analog sensor signals in the normal mode. In some versions of those embodiments the analog sensor signals are temperature signals from sensing of temperature of a LED module driven by the LED driver. The programming signal can be received via a network interface.

In some embodiments, the method further includes utilizing at least one of the third processor input and the fourth processor input to reset the processor. In some versions of those embodiments the method further includes using stored energy from a capacitor to maintain the programming mode during reset of the processor. The stored energy may optionally be supplied to a switching device to maintain a switching status thereof.

Generally, in another aspect, a LED driver having a reprogrammable processor is provided and includes a mains power supply input, a LED power supply output providing a refined LED power supply output from the mains power supply input, and a processor configuring at least one characteristic of the LED power supply output. The processor has a first processor input, a second processor input, a third processor input, and a fourth processor input. The LED driver includes a first control input coupled only to the first processor input in a normal mode and coupled to the third processor input in a programming mode. The LED driver also includes a second control input coupled only to the second processor input in the normal mode and coupled to the fourth processor input in the programming mode. The third processor input and the fourth processor input are programming inputs.

In some embodiments, the first control input is routed to the third processor input through a switching device in the programming mode. In some versions of those embodiments the switching device is a multiplexer. The switching device may optionally have a selector input coupled to a selector output provided by the processor. A capacitor may optionally be coupled in parallel with the selector output and coupled to the selector input of the multiplexer.

In some embodiments, the third programming input is a reset input.

In some embodiments, the fourth programming input is a data input.

As used herein for purposes of the present disclosure, the term "LED" should be understood to include any electroluminescent diode or other type of carrier injection/junction-based system that is capable of generating radiation in response to an electric signal. Thus, the term LED includes, but is not limited to, various semiconductor-based structures that emit light in response to current, light emitting polymers, organic light emitting diodes (OLEDs), electroluminescent strips, and the like. In particular, the term LED refers to light emitting diodes of all types (including semi-conductor and organic light emitting diodes) that may be configured to generate radiation in one or more of the infrared spectrum, ultraviolet spectrum, and various portions of the visible spectrum (generally including radiation wavelengths from approximately 400 nanometers to approximately 700 nanometers). Some examples of LEDs include, but are not limited to, various types of infrared LEDs, ultraviolet LEDs, red LEDs, blue LEDs, green LEDs, yellow LEDs, amber LEDs, orange LEDs, and white LEDs (discussed further below). It also should be appreciated that LEDs may be configured and/or controlled to generate radiation having various bandwidths (e.g., full widths at half maximum, or FWHM) for a given spectrum (e.g., narrow bandwidth, broad bandwidth), and a variety of dominant wavelengths within a given general color categorization.

For example, one implementation of an LED configured to generate essentially white light (e.g., a white LED) may include a number of dies which respectively emit different spectra of electroluminescence that, in combination, mix to form essentially white light. In another implementation, a white light LED may be associated with a phosphor material that converts electroluminescence having a first spectrum to a different second spectrum. In one example of this implementation, electroluminescence having a relatively short wavelength and narrow bandwidth spectrum "pumps" the phosphor material, which in turn radiates longer wavelength radiation having a somewhat broader spectrum.

It should also be understood that the term LED does not limit the physical and/or electrical package type of an LED. For example, as discussed above, an LED may refer to a single light emitting device having multiple dies that are configured to respectively emit different spectra of radiation (e.g., that may or may not be individually controllable). Also, an LED may be associated with a phosphor that is considered as an integral part of the LED (e.g., some types of white LEDs). In general, the term LED may refer to packaged LEDs, non-packaged LEDs, surface mount LEDs, chip-on-board LEDs, T-package mount LEDs, radial package LEDs, power package LEDs, LEDs including some type of encasement and/or optical element (e.g., a diffusing lens), etc.

The term "light source" should be understood to refer to any one or more of a variety of radiation sources, including, but not limited to, LED-based sources (including one or more LEDs as defined above), incandescent sources (e.g., filament lamps, halogen lamps), fluorescent sources, phosphorescent sources, high-intensity discharge sources (e.g., sodium vapor, mercury vapor, and metal halide lamps), lasers, other types of electroluminescent sources, pyro-luminescent sources (e.g., flames), candle-luminescent sources (e.g., gas mantles, carbon arc radiation sources), photo-luminescent sources (e.g., gaseous discharge sources), cathode luminescent sources using electronic satiation, galvano-luminescent sources, crystallo-luminescent sources, kine-luminescent sources, thermo-luminescent sources, triboluminescent sources, sonoluminescent sources, radioluminescent sources, and luminescent polymers.

The term "lighting fixture" is used herein to refer to an implementation or arrangement of one or more lighting units in a particular form factor, assembly, or package. The term "lighting unit" is used herein to refer to an apparatus including one or more light sources of same or different types. A given lighting unit may have any one of a variety of mounting arrangements for the light source(s), enclosure/housing arrangements and shapes, and/or electrical and mechanical connection configurations. Additionally, a given lighting unit optionally may be associated with (e.g., include, be coupled to and/or packaged together with) various other components (e.g., control circuitry) relating to the operation of the light source(s). An "LED-based lighting unit" refers to a lighting unit that includes one or more LED-based light sources as discussed above, alone or in combination with other non LED-based light sources. A "multi-channel" lighting unit refers to an LED-based or non LED-based lighting unit that includes at least two light sources configured to respectively generate different spectrums of radiation, wherein each different source spectrum may be referred to as a "channel" of the multi-channel lighting unit.

The term "controller" is used herein generally to describe various apparatus relating to the operation of one or more light sources. A controller can be implemented in numerous ways (e.g., such as with dedicated hardware) to perform various functions discussed herein. A "processor" is one example of a controller which employs one or more microprocessors that may be programmed using software (e.g., microcode) to perform various functions discussed herein. A controller may be implemented with or without employing a processor, and also may be implemented as a combination of dedicated hardware to perform some functions and a processor (e.g., one or more programmed microprocessors and associated circuitry) to perform other functions. Examples of controller components that may be employed in various embodiments of the present disclosure include, but are not limited to, conventional microprocessors, application specific integrated circuits (ASICs), and field-programmable gate arrays (FPGAs).

In various implementations, a processor or controller may be associated with one or more storage media (generically referred to herein as "memory," e.g., volatile and non-volatile computer memory such as RAM, PROM, EPROM, and EEPROM, floppy disks, compact disks, optical disks, magnetic tape, etc.). In some implementations, the storage media may be encoded with one or more programs that, when executed on one or more processors and/or controllers, perform at least some of the functions discussed herein. Various storage media may be fixed within a processor or controller or may be transportable, such that the one or more programs stored thereon can be loaded into a processor or controller so as to implement various aspects of the present invention discussed herein. The terms "program" or "computer program" are used herein in a generic sense to refer to any type of computer code (e.g., software or microcode) that can be employed to program one or more processors or controllers.

The term "addressable" is used herein to refer to a device (e.g., a light source in general, a lighting unit or fixture, a controller or processor associated with one or more light sources or lighting units, other non-lighting related devices, etc.) that is configured to receive information (e.g., data) intended for multiple devices, including itself, and to selectively respond to particular information intended for it. The term "addressable" often is used in connection with a networked environment (or a "network," discussed further below), in which multiple devices are coupled together via some communications medium or media.

In one network implementation, one or more devices coupled to a network may serve as a controller for one or more other devices coupled to the network (e.g., in a master/slave relationship). In another implementation, a networked environment may include one or more dedicated controllers that are configured to control one or more of the devices coupled to the network. Generally, multiple devices coupled to the network each may have access to data that is present on the communications medium or media; however, a given device may be "addressable" in that it is configured to selectively exchange data with (i.e., receive data from and/or transmit data to) the network, based, for example, on one or more particular identifiers (e.g., "addresses") assigned to it.

The term "network" as used herein refers to any interconnection of two or more devices (including controllers or processors) that facilitates the transport of information (e.g. for device control, data storage, data exchange, etc.) between any two or more devices and/or among multiple devices coupled to the network. As should be readily appreciated, various implementations of networks suitable for interconnecting multiple devices may include any of a variety of network topologies and employ any of a variety of communication protocols. Additionally, in various networks according to the present disclosure, any one connection between two devices may represent a dedicated connection between the two systems, or alternatively a non-dedicated connection. In addition to carrying information intended for the two devices, such a non-dedicated connection may carry information not necessarily intended for either of the two devices (e.g., an open network connection). Furthermore, it should be readily appreciated that various networks of devices as discussed herein may employ one or more wireless, wire/cable, and/or fiber optic links to facilitate information transport throughout the network.

The term "user interface" as used herein refers to an interface between a human user or operator and one or more devices that enables communication between the user and the device(s). Examples of user interfaces that may be employed in various implementations of the present disclosure include, but are not limited to, switches, potentiometers, buttons, dials, sliders, a mouse, keyboard, keypad, various types of game controllers (e.g., joysticks), track balls, display screens, various types of graphical user interfaces (GUIs), touch screens, microphones and other types of sensors that may receive some form of human-generated stimulus and generate a signal in response thereto.

It should be appreciated that all combinations of the foregoing concepts and additional concepts discussed in greater detail below (provided such concepts are not mutually inconsistent) are contemplated as being part of the inventive subject matter disclosed herein. In particular, all combinations of claimed subject matter appearing at the end of this disclosure are contemplated as being part of the inventive subject matter disclosed herein. It should also be appreciated that terminology explicitly employed herein that also may appear in any disclosure incorporated by reference should be accorded a meaning most consistent with the particular concepts disclosed herein.

In the drawings, like reference characters generally refer to the same parts throughout the different views. Also, the drawings are not necessarily to scale, emphasis instead generally being placed upon illustrating the principles of the invention.

In certain implementations of LED-based lighting fixtures, it is desirable to have the capability to upgrade the software of the processor of the LED driver powering the LEDs. For example, it may be desirable to upgrade the software of an LED driver processor to incorporate new features and/or to address bug fixes. Upgrades have been performed utilizing a communication means such as DALI utilizing the "in-application" programming capability of some processors. Dedicated programming wires have also been utilized to perform upgrades to some processors. Although such in-application programming and/or dedicated programming wires may be utilized to upgrade the firmware of processors, the techniques have one or more drawbacks. For example, not all processors support in-application programming, in-application programming may be slow, and/or programming wires may cause increased materials costs and/or increased space requirements in the LED driver. Thus, Applicants have recognized and appreciated a need in the art to provide methods and apparatus for external programming of at least one processor of a LED driver utilizing control inputs of the LED driver that optionally overcomes one or more drawbacks of existing programming methods.

More generally, Applicants have recognized and appreciated that it would be beneficial to provide external programming of at least one processor of a LED driver utilizing inputs of the LED driver. In view of the foregoing, various embodiments and implementations of the present invention are directed to external programming of at least one processor of a LED driver.

Figure 1:
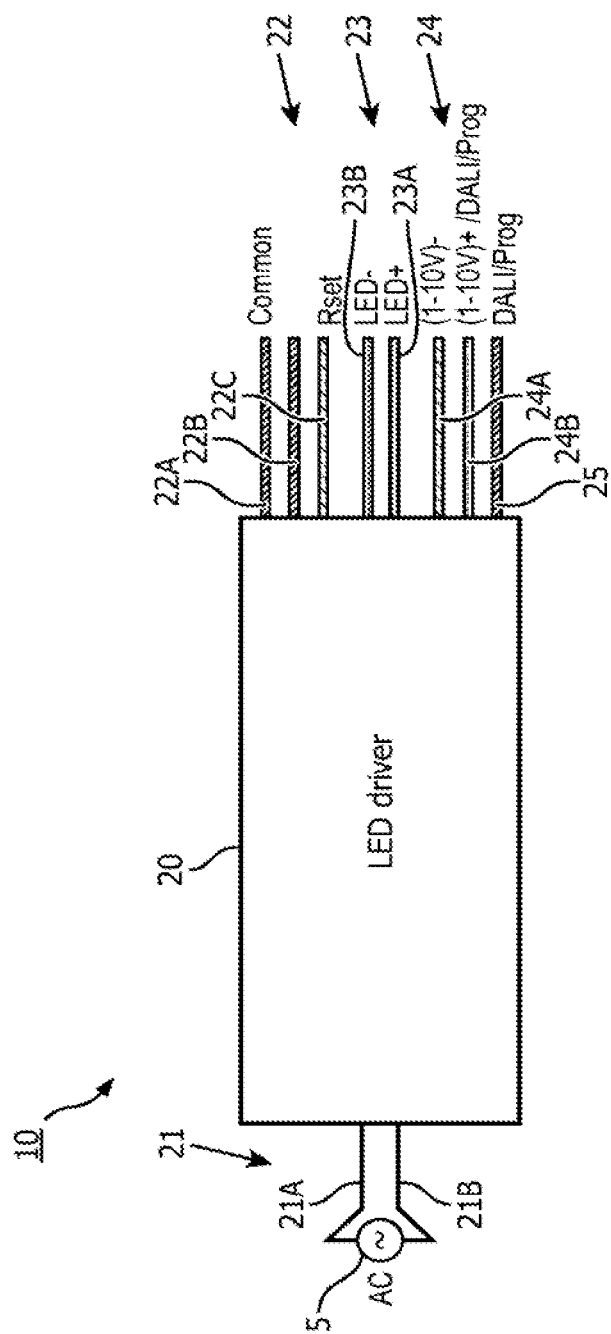
FIG. 1 illustrates an embodiment of a LED driver.

Referring to FIG. 1, an embodiment of a LED driver 10 is illustrated. The LED driver 10 includes an LED driver housing 20 enclosing a plurality of LED driver components for converting mains power 5 to appropriate refined output for driving a LED light source. LED driver components may include, for example, an AC to DC converter and a DC to DC converter of a power train of the LED driver that collectively refine mains power 5 for supplying to a LED light source. LED components may also include, for example, the processor 30, multiplexer components 50 and 55, diode 62, and/or capacitor 64 illustrated in FIGS. 2A and 2B.

The mains power 5 is supplied to the LED driver 10 via mains power input 21 having a mains hot input 21A and a mains neutral input 21B. In some embodiments a mains ground input may additionally be provided. Refined output for driving a LED light source is provided over DC output 23 having a positive DC output 23A and a negative DC output 23B. Dimming input 24 is provided to LED driver 10 over dimming positive input 24A and dimming negative input 24B. The DC output 23 is adjusted in response to a change in voltage supplied over dimming input 24 to effectuate dimming of a LED light source connected to DC output 23. For example, the average current of the DC output 23 may be adjusted in response to a change in voltage supplied over dimming input 24. The dimming positive input 24A and dimming negative input 24B may be coupled to the processor 30 and the processor 30 may adjust one or more characteristics of another driver component (e.g., the power train) to effectuate appropriate dimming based on the input received via dimming positive input 24A and dimming negative input 24B. In other embodiments the dimming hot input 24A and dimming neutral input 24B may be directly coupled to another controller or another LED driver component to effectuate dimming.

Network communication is also supplied to the LED driver 10 via network communication input 25. The network communication input 25 may enable receipt and/or transmission of network communications. For example, the network communication input 25 may provide for communications utilizing the Dali protocol. In other embodiments that implement network communication, other network communication protocols and/or communication mediums may be utilized. For example, the communication mediums may include any physical medium, including, for example, twisted pair coaxial cables, fiber optics, or a wireless link using, for example, infrared, microwave, or encoded visible light transmissions and any suitable transmitters, receivers or transceivers to effectuate communication in the network. Also, for example, the communications protocols may include any suitable protocol for data transmission, including, for example, TCPIP, variations of Ethernet, Universal Serial Bus, Bluetooth, FireWire, Zigbee, DMX, Dali, 802.11b, 802.11a, 802.11g, token ring, a token bus, serial bus, power line networking over mains or low voltage power lines, and/or any other suitable wireless or wired protocol. The network communication input 25 may be coupled to the processor 30 and the processor 30 may adjust one or more characteristics of another driver component to effectuate appropriate control of an attached LED light source based on the input received via network communication wire 25. For example, aspects of a desired lighting scene may be transmitted via network communication wire 25 and processor 30 may adjust parameters of the DC output 23 to effectuate such lighting scene aspects.

Control input 22 is also supplied to the LED driver 10 via control inputs 22A-C. The control input 22A may be a common or ground input and the control inputs 22B and 22C may be external sensor inputs. For example, in some embodiment the control input 22C may be an analog input that provides analog signals indicative of the nominal current of a driven LED light source and/or the control input 22B may be an analog input that provides analog signals indicative of sensed temperature at the driven LED light source. The control input wires 22A-C may be coupled to the processor 30 and the processor 30 may adjust one or more characteristic of another driver component based on signals received via control input wires 22B and/or 22C. For example, the processor 30 may cause the DC output 23 to be decreased based on high temperature readings received via control input 22B to attempt to maintain the temperature at the driven LED light source below a maximum value. Although a specific LED driver 10 with specific inputs is illustrated and described herein, one of ordinary skill in the art, having had the benefit of the present disclosure, will recognize and appreciate that various LED driver configurations implementing various internal LED driver components and various LED driver inputs and/or outputs may incorporate external programming of at least one processor thereof according to methods and/or apparatus discussed herein.

Figure 2A:
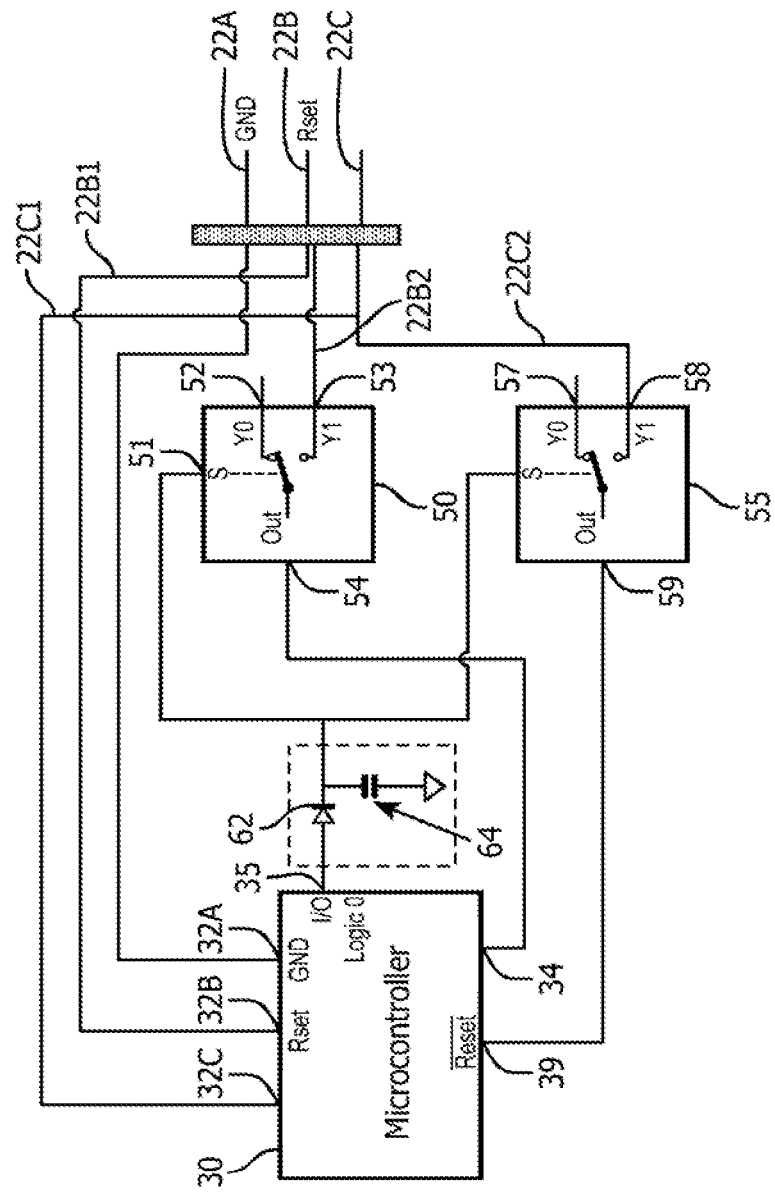
FIG. 2A illustrates connections between control inputs of the LED driver of FIG. 1 and a processor of the LED driver of FIG. 1 in a normal mode.
Figure 2B:
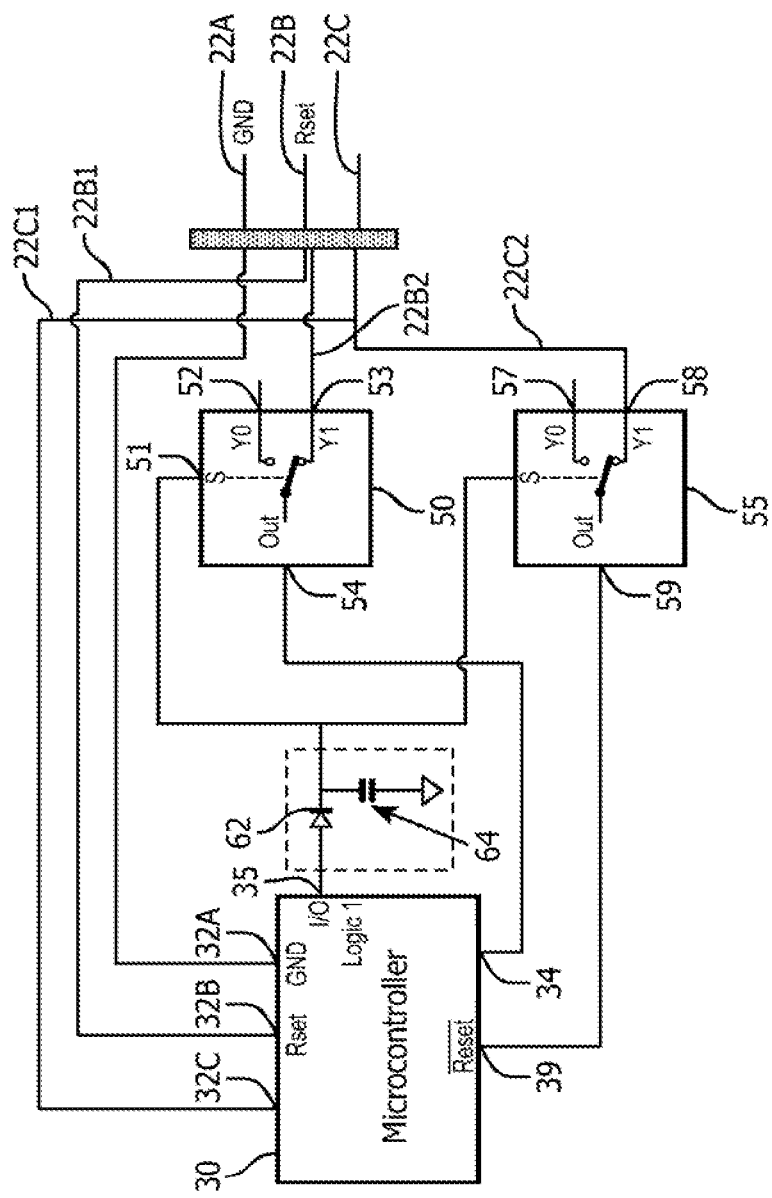
FIG. 2B illustrates connections between the control inputs and the processor of the LED driver of FIG. 1 in a programming mode.

Referring to FIGS. 2A and 2B, connections between control inputs 22A-C and the processor 30 of the LED driver 10 are illustrated. FIG. 2A illustrates those connections in a normal mode and FIG. 2B illustrates those connections in a programming mode. One of ordinary skill in the art, having had the benefit of the present disclosure, will recognize and appreciate that additional connections to the processor 30 will be provided. For example, a DC power connection will be provided and/or other input connections may be provided (e.g., connections to dimming input 24 and/or network communication input 25).

In FIGS. 2A and 2B the control input 22A is electrically coupled to a common or ground input 32A of the processor 30. The control input 22B has a first lead 22B1 that is electrically coupled to a first sensor input 32B of the processor 30 and a second lead 22B2 that is electrically coupled to a second input 53 of a multiplexer component 50. The control input 22C has a first lead 22C1 that is electrically coupled to a second sensor input 32C of the processor 30 and a second lead 22C2 that is electrically coupled to a second input 58 of a multiplexer component 55. In some embodiments multiplexer components 50 and 55 may form part of single multiplexer. In some other embodiments multiplexer components 50 and 55 may be distinct components. The multiplexer 50 also has a first input 52 that is not electrically connected, an output 54 that is electrically connected to a data programming input 34 of the processor 30, and a selector input 51 that is electrically connected a selector output 35 of the processor 30. The multiplexer 55 also has a first input 57 that is not electrically connected, an output 59 that is electrically connected to a reset programming input 39 of the processor 30, and a selector input 56 that is electrically connected the selector output 35 of the processor 30.

In the normal mode of FIG. 2A, the processor 30 supplies a logic low (Y0) output over selector output 35, which is electrically coupled to the selector inputs 51 and 56. In response to receiving a logic low at selector input 51 the multiplexer component 50 provides first input 52 over output 54 and in response to receiving a logic low at selector input 56 the multiplexer component 55 provides first input 57 over output 59. Accordingly, in the normal mode the data programming input 34 and the reset programming input 39 of the processor 30 are not connected to the control inputs 22B and 22C.

In the programming mode of FIG. 2B, the processor 30 supplies a logic high (Y1) over selector output 35. In response to receiving a logic high at selector input 51 the multiplexer component 50 provides second input 53 over output 54 and in response to receiving a logic high at selector input 56 the multiplexer component 55 provides second input 58 over output 59. Accordingly, in the programming mode the data programming input 34 and the reset programming input 39 of the processor 30 are connected to the control inputs 22B and 22C. The programming mode may be entered in response to receiving a programming signal. In some embodiments the processor 30 may receive a programming signal via network communication wire 25. For example, a programming signal may be sent via a Dali communications protocol over network communication wire 25. In some other embodiments a programming signal may be received via the mains power input 21 (e.g., a signal overlaid with the mains power or disruptions in the mains power consistent with a predetermined programming signal), the dimming input 24 (e.g., a predetermined voltage modulation pattern), and/or a user interface (e.g., a mechanical switch producing an output coupled to the processor 30).

Although a specific implementation of multiplexer components 50 and 55 is illustrated and described herein, one of ordinary skill in the art, having had the benefit of the present disclosure, will recognize and appreciate that other switching devices and/or switching methods that provide for selective application of control inputs 22B and 22C to programming inputs 34 and 39 may alternatively be utilized in some embodiments. For example, in some embodiments a flip-flop may be utilized to latch the inputs 22B and 22C. Also, for example, in some embodiments a demultiplexer may be utilized that receives the control input 22B and outputs the control input 22B to either the first sensor input 32B or the data programming input 34, depending on the status of a received selector signal. The demultiplexer may also receive the control input 22C and output the control input 22C to either the second sensor input 32C or the reset programming input 39 depending on the status of a received selector signal. Accordingly, such a demultiplexer configuration may direct the control inputs 22B, 22C to programming inputs 34, 39 only in response to a first selector signal (in programming mode) and direct the control inputs 22B, 22C to sensor inputs 32B, 32C only in response to a second selector signal (in normal mode).

Figure 3:
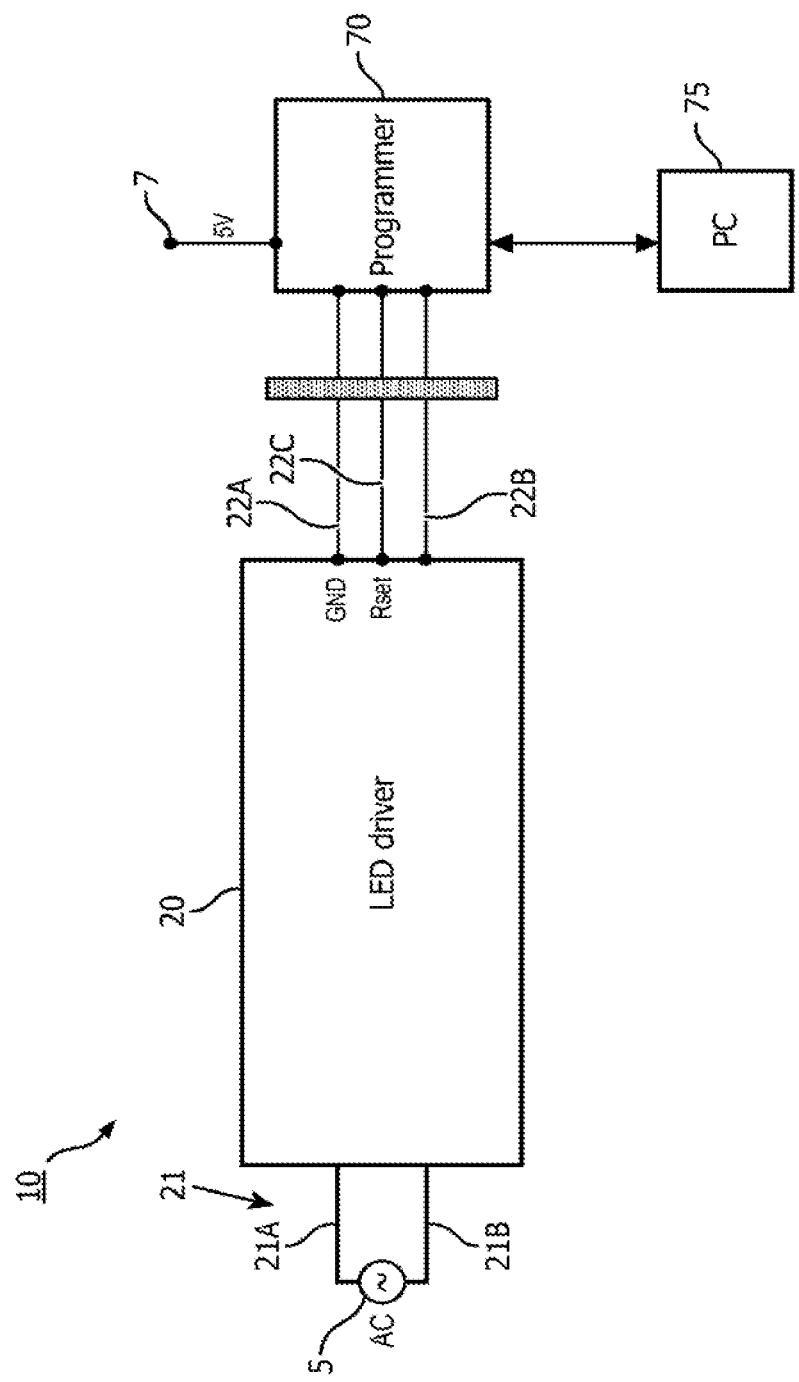
FIG. 3 illustrates connections between a programmer and the control inputs of the LED driver of FIG. 1.

In the programming mode of FIG. 2B, access is provided to the ground input 32A and programming pins 34, 39 of the processor 30 via control inputs 22A-C, thereby enabling programming of the processor 30 via control inputs 22A-C. As illustrated in FIG. 3, a programmer 70 may be electrically coupled to the control inputs 22A-C. Since the processor 30 is already supplied with power via the mains power 5, an external power supply for powering the processor 30 is not required. The programmer 70 may however be powered independently with an isolated 5V supply 7 in order to send programming data to the processor 30. The programmer 70 may optionally at least selectively be in communication with a computer 75 to, inter alia, receive updated firmware for supplying to the processor 30 and/or to receive instructions related to communicating with the processor 30.

While in the programming mode, the reset programming input 39 of the processor 30 may be pulled low. For example, when the programmer 70 is electrically coupled to the control inputs 22A-C, it may pull the reset programming input 39 of the processor 30 low to place the processor 30 into a reset state and enable reprogramming of the processor 30. When the reset programming input 39 is pulled low and the processor 30 is in a reset state, all the pins of the microcontroller may be in a floating state. Accordingly, the logic high provided over the selector output 35 during the programming mode may be temporarily lost. To retain the logic high at the selector inputs 51 and 56, a diode 62 and a capacitor 64 are utilized to latch the logic level in a high state for a fixed duration. The diode 62 is connected in series between the selector output 35 and the selector inputs 51 and 56 and the capacitor 64 is connected in parallel with the diode 62. The capacitor 64 may be sized to ensure the logic level is maintained in a high state for a duration that is appropriate based on the characteristics of the processor 30 and/or the programmer 70 (e.g., for a duration sufficient to enable processor 30 to reset and provide a logic high over selector output 35 again). Once programming of the processor 30 is complete, the processor 30 may again supply a logic low over selector output 35 and thereby revert to the normal mode of FIG. 2A. The processor 30 may revert back to the normal mode, for example, upon receiving a signal from programmer 70 and/or automatically upon completion of programming.

While several inventive embodiments have been described and illustrated herein, those of ordinary skill in the art will readily envision a variety of other means and/or structures for performing the function and/or obtaining the results and/or one or more of the advantages described herein, and each of such variations and/or modifications is deemed to be within the scope of the inventive embodiments described herein. More generally, those skilled in the art will readily appreciate that all parameters, dimensions, materials, and configurations described herein are meant to be exemplary and that the actual parameters, dimensions, materials, and/or configurations will depend upon the specific application or applications for which the inventive teachings is/are used. Those skilled in the art will recognize, or be able to ascertain using no more than routine experimentation, many equivalents to the specific inventive embodiments described herein. It is, therefore, to be understood that the foregoing embodiments are presented by way of example only and that, within the scope of the appended claims and equivalents thereto, inventive embodiments may be practiced otherwise than as specifically described and claimed. Inventive embodiments of the present disclosure are directed to each individual feature, system, article, material, kit, and/or method described herein. In addition, any combination of two or more such features, systems, articles, materials, kits, and/or methods, if such features, systems, articles, materials, kits, and/or methods are not mutually inconsistent, is included within the inventive scope of the present disclosure.

All definitions, as defined and used herein, should be understood to control over dictionary definitions, definitions in documents incorporated by reference, and/or ordinary meanings of the defined terms.

It should also be understood that, unless clearly indicated to the contrary, in any methods claimed herein that include more than one step or act, the order of the steps or acts of the method is not necessarily limited to the order in which the steps or acts of the method are recited. Also, reference numerals appearing between parentheses in the claims, if any, are provided merely for convenience and should not be construed as limiting in any way.

In the claims, as well as in the specification above, all transitional phrases such as "comprising," "including," "carrying," "having," "containing," "involving," "holding," "composed of," and the like are to be understood to be open-ended, i.e., to mean including but not limited to. Only the transitional phrases "consisting of" and "consisting essentially of" shall be closed or semi-closed transitional phrases, respectively.

The invention claimed is:

1. A LED driver having a reprogrammable processor, comprising:
   a mains power supply input;
   a LED power supply output providing a refined LED power supply output from said mains power supply input;
   a processor configuring at least one characteristic of said LED power supply output, said processor having a first processor input, a second processor input, a third processor input, and a fourth processor input;
   a first control input coupled only to said first processor input in a normal mode and coupled to said third processor input in a programming mode; and
   a second control input coupled only to said second processor input in said normal mode and coupled to said fourth processor input in said programming mode, wherein said third processor input and said fourth processor input are programming inputs, and wherein the first control input, the second control input, the first processor input, the second processor input, the third processor input and the fourth processor input are distinct from each other;

wherein said first control input is routed to said third processor input through a switching device in said programming mode; and wherein said switching device has a selector input coupled to a selector output provided by said processor, wherein said LED driver further comprises a capacitor coupled in parallel with said selector output and coupled to said selector input.

2. The LED driver of claim 1, wherein said switching device is a multiplexer.

3. The LED driver of claim 1, wherein said third programming input is a reset input.

4. The LED driver of claim 1, wherein said fourth programming input is a data input.

* * * * *